June 14, 1938.　　　　I. I. SIKORSKY　　　　2,120,717
TRIMMING MEANS FOR CONTROL SURFACES
Filed May 15, 1936　　　3 Sheets-Sheet 1
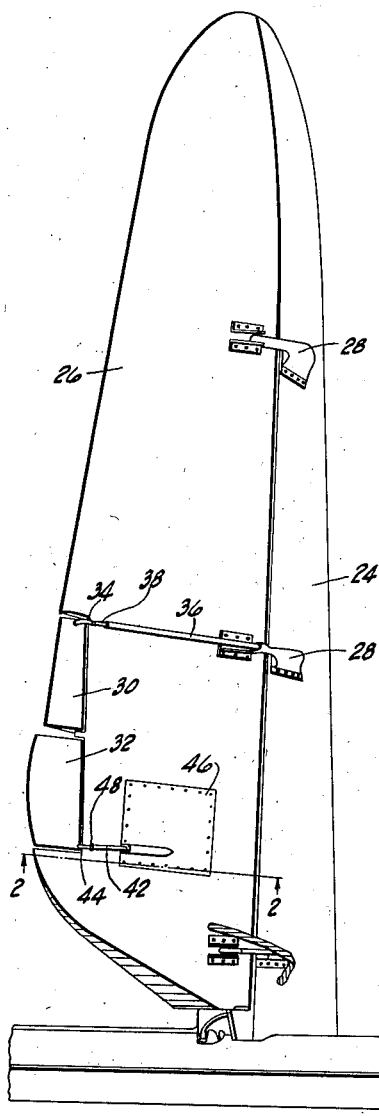
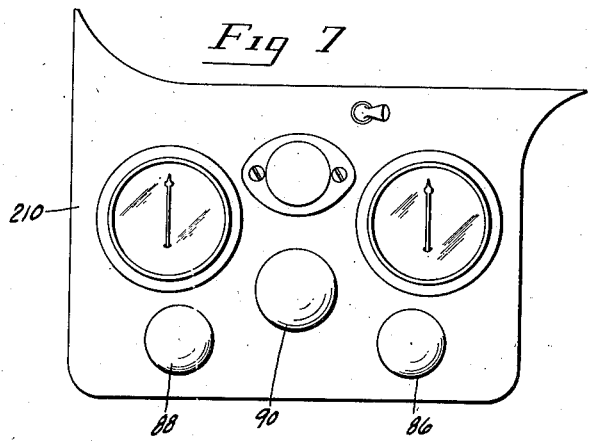
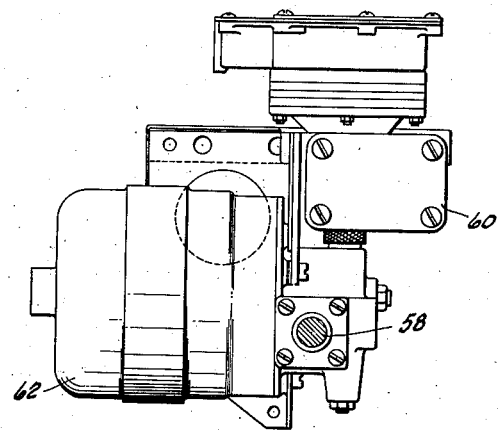
INVENTOR.
IGOR I. SIKORSKY
BY Harris G. Luther
ATTORNEY

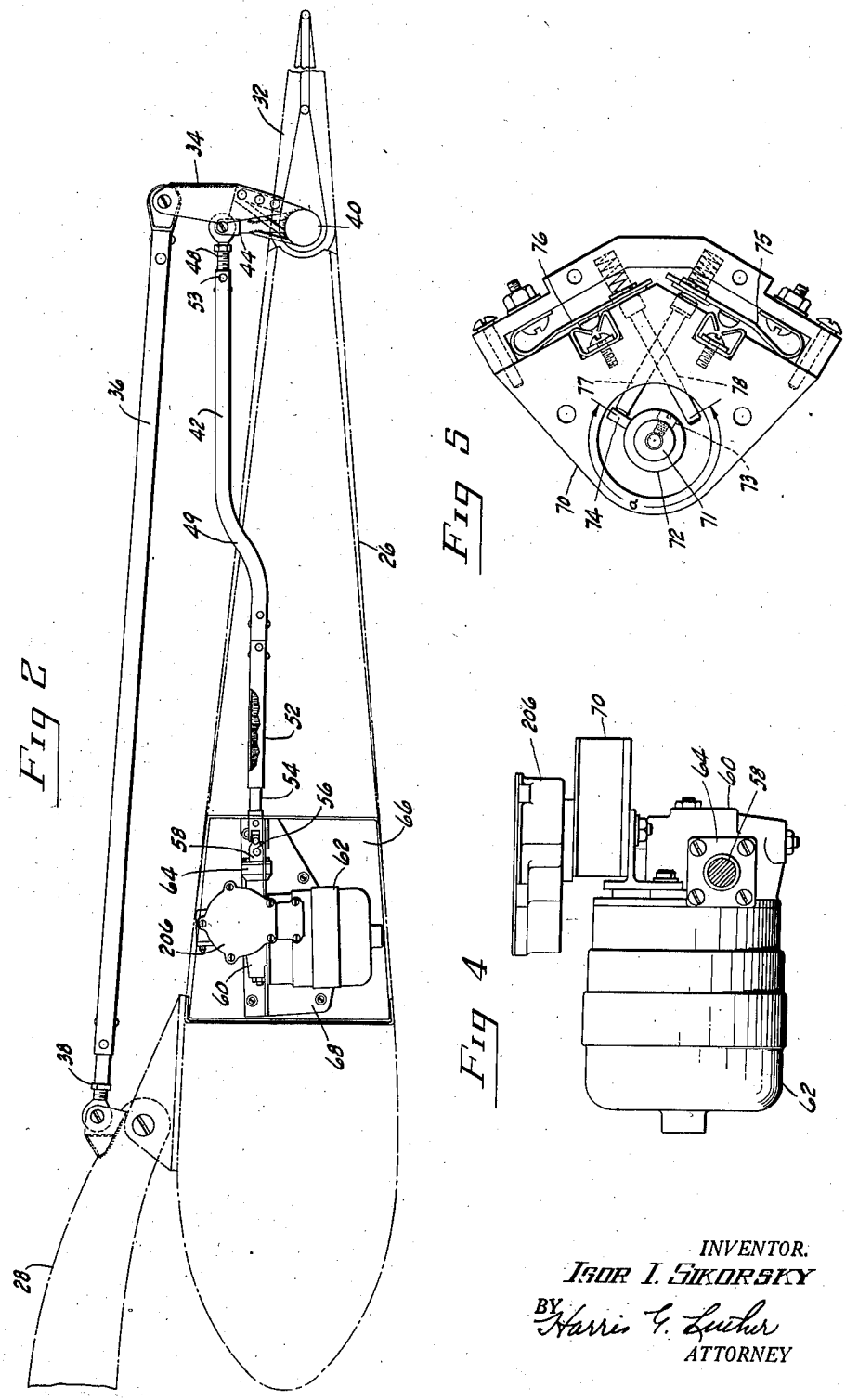

June 14, 1938. I. I. SIKORSKY 2,120,717
TRIMMING MEANS FOR CONTROL SURFACES
Filed May 15, 1936 3 Sheets-Sheet 3

INVENTOR.
IGOR I SIKORSKY
BY Harris G. Luther
ATTORNEY

Patented June 14, 1938

2,120,717

UNITED STATES PATENT OFFICE 2,120,717

TRIMMING MEANS FOR CONTROL SURFACES

Igor I. Sikorsky, Trumbull, Conn., assignor to United Aircraft Corporation, East Hartford, Conn., a corporation of Delaware Application May 15, 1936, Serial No. 79,839

2 Claims. (Cl. 244—87)

This invention relates to improvements in trimming means for control surfaces and has particular reference to the operation of a trimming tab used in connection with a control surface such as the rudder of an airplane.

While the accompanying drawings illustrate the invention as applied to the rudder, or rudders, of a particular type of airplane, the invention is not limited to this particular application, but may be used in combination with any of the control surfaces of any fluid supported vehicle.

An object of the invention resides in the provision of power actuated means for controlling the trimming tab movably attached to a control surface for the purpose of adjusting the control surface to overcome out-of-trim conditions of the vehicle upon which it is mounted.

A further object resides in the provision of a manual control device having power actuated means whereby the trimming tab may be easily and sensitively controlled by the operator of the vehicle.

A still further object resides in the provision of power actuated means for operating the trimming tab located in and carried by the control surface to which the trimming tab is attached.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the invention and one slightly modified form thereof. The drawings, however, are for the purpose of illustration only and are not to be taken as limiting the invention, the scope of which is to be measured entirely by the scope of the appended claims.

In the drawings, Fig. 1 is a perspective elevational view of a fragmentary portion of an empennage showing a vertical stabilizer, a rudder attached to the stabilizer, and a plurality of tabs attached to the rudder for the purpose of assisting the operator of the vehicle in actuating the rudder and for adjusting the rudder to correct out-of-trim conditions of the vehicle upon which the rudder is mounted.

Fig. 2 is a horizontal sectional view of the rudder taken approximately on the line 2—2 of Fig. 1 and shows the installation of the power actuated tab operating mechanism in the rudder.

Fig. 3 is a side elevational view of the electric motor and reduction gear which constitutes the major portion of the power actuated tab operating mechanism.

Fig. 4 is a side elevational view of a motor similar to that illustrated in Fig. 3, but showing a somewhat modified form of reduction gear and limit switch.

Fig. 5 is a top plan view of the modified form of limit switch with the cover of the limit switch casing removed.

Fig. 7 is an elevational view of the instrument panel mounting of the tab control switches and tab position indicators.

Figure 6:
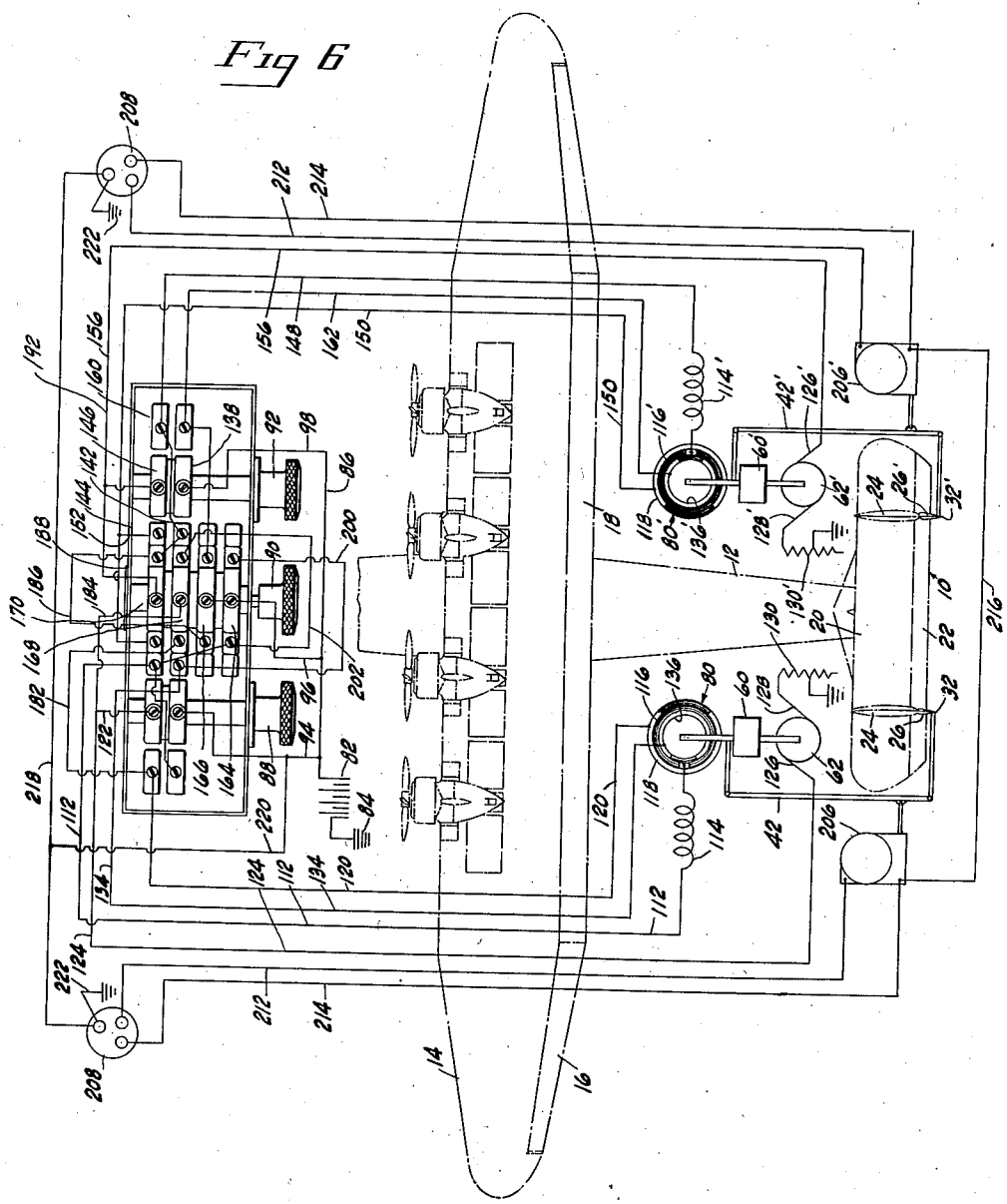
Fig. 6 is a schematic diagram of the wiring installation for operating and controlling the tab operating mechanism.

Referring to the drawings in detail, and particularly to Figs. 1 and 6, there is illustrated an airplane or flying boat having an empennage generally indicated at 10, movably mounted upon the rear end of a hull 12 upon which is mounted a supporting wing 14 provided with ailerons 16 and a lift increasing flap 18. The empennage comprises a tiltable horizontal stabilizer 20 to which are hingedly attached the horizontal rudders or elevators 22. The stabilizer 20 has rigidly attached thereto and extending upwardly from its upper surface, a pair of vertical stabilizers or fins 24, one of which is particularly illustrated in Fig. 1, to the trailing edge of each of which there is hingedly attached a rudder 26 by means of suitable connections such as the horn hinges 28. While the particular type of airplane illustrated has two vertical fins and a rudder attached to each fin, the invention is in no way limited to this particular construction as it is also readily applicable to an airplane having but a single vertical fin and rudder. In this description, however, a particular application of the tab operating mechanism in a twin ruddered ship has been illustrated as applicable to that type of installation.

At the trailing edge of the rudder 26 there is hingedly attached a balancing tab 30 and a trimming tab 32. While these tabs have been illustrated as used in combination with the vertical rudder, they could be applied to other control surfaces such as the aileron 16, the flap 18, or the elevator 22 without exceeding the scope of the invention.

The balancing tab 30 is hinged along its forward edge to the trailing edge of the rudder and is connected by means of a bracket 34 and a link 36 to the center hinge horn 28 so that the tab will be moved relative to the rudder when the rudder is swung about its hinge connection with the vertical fin 24 to assist the pilot in operating the rudder to control the flight of the airplane. The link 36 is provided with a length adjusting connection 38 by means of which the tab 30 may be centered relative to the rudder when the rudder is in its normal position directly rearwardly of the fin 24.

The trimming tab 32 which, in the form of apparatus illustrated, is located immediately below the balancing tab 30, is hinged at its leading edge to the trailing edge of the rudder by means of a hinge pin 40 particularly illustrated in Fig. 2, and is adjustable about this connection to various angular positions with respect to the rudder to exert a force upon the rudder which will in turn exert a force upon the tail or empennage of the aircraft to correct out-of-trim conditions existing at any time in the aircraft. The trimming tab 32 is moved to its various angular relations with respect to the rudder by means of an actuating link 42 which is connected at its rear end to a bracket 44 secured to the trimming tab and at its forward end to a tab actuating mechanism located in a suitable compartment in the rudder 26, such compartment being ordinarily concealed by the cover plate 46. This link 42 is provided with a length adjusting connection 48 by means of which the trimming tab 32 can be centered with respect to the rudder when the tab operating mechanism is in its medial or neutral position. The forward end of the link 42 extends into the interior of the rudder through the cover plate 46, the link being provided with a suitable bend 49 intermediate its length to bring the forward end within the rudder.

The forward end of the link 42 within the rudder is provided with an interiorly threaded tubular portion 52 which receives an exteriorly threaded rotatable shaft 54, the link and tubular portion 52 being restrained against rotation by the connection with the bracket 44 and by pins 53 inserted through the length adjusting connection 48, the shaft 54 is connected by means of a universal joint 56 with a rotatable shaft 58 mounted in a gear casing 60 supported upon one end of an electric motor 62 adjacent to the universal joint, the rotatable shaft 58 extends through an anti-friction bearing 64 which centers the end of the shaft and absorbs any radial loads imposed upon the universal joint. The motor 62 is supported within the compartment 66 by means of a suitable supporting base 68 suitably attached to the motor and bolted to the frame structure of the rudder. The motor 62 is a reversible electric motor and is operable in either direction of rotation for a purpose presently to be described. Suitable reduction gearing is provided in the gear case 60 so that the shaft 58 rotates at a small fraction of the speed of the motor armature, thus giving the motor a very large leverage and permitting the use of a small low powered motor for the purpose of operating the trimming tab. A further reduction is obtained through the threaded screw jack connection between the tubular portion 52 and the shaft 54. Preferably, an additional shaft is provided, geared to the shaft 58 by a suitable reduction gear, for the purpose of operating a pair of suitable limit switches contained in the casing 70 for de-energizing the motor whenever the trimming tab 32 has been moved to its limiting position in one direction or the other.

Several forms of limit switches have been found applicable to the construction, the rotatable form illustrated at 80 in Fig. 6 having been operated with complete success. The special form illustrated in Figs. 4 and 5 however possess certain special characteristics, such as quick and positive action and great durability, which render its use particularly desirable in certain installations. In the form of limit switch indicated at 70 the shaft 71 is disposed substantially at right angles to the drive shaft 58 and is driven by a reduction gear in such a manner that it rotates through the arc $a$ when the drive shaft makes sufficient revolutions to move the trimming tab from one to the other of its two limiting positions. The shaft 71 carries a sleeve member 72 secured thereon against relative rotation by suitable means such as the set screw 73 and provided with an outwardly extending arm or projection 74. The electrical conduits carrying current to the motor 62 are led through spring contacts 75 and 76 and each of these contacts is provided with an elongated pin as indicated at 77 and 78 so constructed and arranged that their ends remote from the respective contacts are located in a position where they will be respectively engaged by the arm or extension 74 at each end of the arc $a$ to break the connection through the respective spring contacts 75 and 76.

From the above description it will be observed that rotation of the motor 62 in one direction will operate through the reduction gears to rotate the shaft 58 and operate the screw jack comprising the threaded elements 52 and 54 to move the link 42 lengthwise of its end, swing the tab 32 in a direction corresponding to the direction of rotation of the motor and that rotation of the motor in the opposite direction will act through these same agencies to swing the tab 32 in the opposite direction. At each limiting position of the tab the proper spring contact 75 or 76 will be opened so that the motor cannot be energized to tend to move the tab further in that direction, but, as the alternate spring contact remains closed, the motor may be energized to move the tab toward its opposite limiting position.

It is desirable that the motor may be operated in either direction by the pilot at will, and to such an extent as the pilot may desire, and, in the case of an airplane having two rudders, such as that illustrated, it is also desirable that the tabs attached to the respective rudders may be moved individually or separately in either direction by appropriate operation of the tab operating motor. For this purpose there has been provided the wiring and control switch system particularly illustrated in Fig. 4. In this figure the numerals applied to the parts in the other figures are applied to the left hand tab and its actuating mechanism, while the numerals applied to the right hand tab and its actuating mechanism have been differentiated by a prime after the numeral.

Both motors 62 and 62' receive their motive force from some suitable source of power such as the battery 82. One side of the battery is grounded as indicated at 84, and the other side is connected to a bus bar 86 from which leads extend to the three separate switches 88, 90, and 92, the leads being indicated at 94, 96 and 98 respectively. The right hand switch 92 controls the right hand motor 62', the left hand switch 88 controls the left hand motor 62, and the centrally located switch 90 controls both motors simultaneously.

Considering first the operation of the left hand motor 62 when under the control of the individual switch 88, if the switch 88 be rotated to the left as viewed in Fig. 4, the switch contacts 100 and 102 will make contact with the fixed contacts 104 and 106. The current will now flow through the lead 94 from the bus bar 86 to the movable contact 100 and from there through the fixed contact 104 along the connection 108 to the fixed contact 110 and from thence along the conduit 112 to the right hand end of the motor field 114 and from the left hand end of the motor field to the fixed element 116 of the limit switch 80 located in the casing 70, and from thence through the outer movable element 118 of the limit switch and along the conduit 120 to the fixed contact 106, then from the fixed contact 106 through the movable contact 102 and along the conduits 122 and 124 to one brush 126 of the motor, the other brush, 128, of the motor being grounded through a variable resistance 130 by means of which the speed of the motor may be adjusted to equalize the speeds of the two motors 62 and 62'.

From this description it will be observed that the rotation of the switch 88 to the left will connect the motor 62 with the battery 82 in a manner to cause the motor to rotate in a predetermined direction by reason of the direction of the flow of current through the field 114. If the switch 88 is rotated to the right instead of to the left, the movable contacts 100 and 102 will be brought into contact with the fixed contacts 132 and 110 respectively. Under these conditions the current will flow from the battery through the lead 94 to the movable contact 100 and from this movable contact to the fixed contact 132 and from thence through the conduit 134 to the inner movable element 136 of the limit switch 80, from the element 136 to the fixed element 116 and from thence to the right hand end of the field 114 and from the left hand end of the field through the conduit 112 back to the fixed contact 110 from which it will flow through the movable contact 102, conduits 122 and 124 to the brush 126 and through the motor armature and brush 128 to the ground through the resistance 130. Thus it will be seen that rotating the switch 88 toward the right as viewed in Fig. 4 will cause the motor to rotate in a direction opposite to that described in connection with a left hand rotation of the switch by reason of the current being forced through the field 114 in an opposite direction. From this description it is apparent that the pilot may control the motor 62 and cause it to rotate in either direction desired by simply rotating the switch 88 in the appropriate direction.

The right hand motor 62' may be caused to operate in the same manner by appropriate rotation of the switch 92. If the switch 92 be rotated to the left as viewed in Fig. 4, the movable contacts 138 and 140 will be brought into contact with the fixed contacts 142 and 144 respectively. Under these conditions the current will flow from the bus bar 86 through the lead 98 to the movable contact 138 and from thence through the fixed contact 142, the lead 146, and conduit 148, to the right hand end of the motor field 114'. Then, from the left hand end of the motor field to the central fixed portion 116' of the limit switch 80' and through the outer movable portion 118' of the limit switch to the conduit 150 through which it will flow to the lead 152 and through this lead to the fixed contact 144. From the fixed contact 144 the current then flows through the movable contact 140 and lead 154 to the conduit 156 from which it flows to the right hand brush 126' of the motor 62', the left hand brush 128' being grounded through a variable resistance 130'. Thus rotation of the switch 92 to the left will cause the motor 62' to rotate in one specific direction but will not in any way affect the left hand motor 62. If the switch 92 is rotated to the right as viewed in Fig. 4 the movable contacts 138 and 140 will make contact with the fixed contacts 158 and 160. The current will then flow from the bus bar 86, through the lead 98, to the movable contact 138, and from thence through the fixed contact 158 to the conduit 162 through which it will flow to the inner movable element 136' of the limit switch 80', and from this inner movable element through the fixed central element 116' to the left hand end of the field and thence through the conduit 148 to the fixed contact 160 and from this fixed contact to the movable contact 140 and then through the lead 154 and conduit 156 to the brush 126' and from thence through the brush 128' to the ground through the variable resistance 130'. Thus it will be seen that rotating the switch 92 to the right will cause the motor 62' to rotate in the opposite direction from the direction of rotation when the switch is turned to the left by reason of the reversal of the direction of the flow of current through the field 114'. Thus the right hand motor 62' can be caused to rotate in either direction at the will of the pilot by appropriate operation of the switch 92.

The limit switches 80 and 80' are so arranged that they will interrupt the passage of current to the respective motor 62 or 62' whenever the associated tab 32 or 32' is in its limiting position to one side or the other and the respective switch 88 or 92, or the joint control switch 90 is turned in a direction to operate the motor to cause further movement of the tab in the same direction. Except when the respective tab is in a limiting position, current will always flow from the fixed middle portion of the limit switch to either of the movable outer portions depending upon the direction of the respective switches. The form of limit switch particularly illustrated in Fig. 5 may be substituted for the rotatable limit switch 80 without changing the general organization or exceeding in any way the scope of the invention.

When the pilot desires to operate both tabs simultaneously he makes use of the central, joint control, switch 90. It will be observed that the switch 90 is provided with four movable contacts instead of two as in the case of the switches 88 and 92, and that there are four fixed contacts upon each side of the movable portion of the switch with which the movable contacts respectively associate.

If the switch 90 be rotated to the left, the movable contacts 164, 166, 168, and 170 will be brought into association with the fixed contacts 172, 174, 176, and 178 respectively. Under these conditions the current will flow from the bus bar 136 through the lead 96 to the movable contacts 164 and 166. From the contact 164 the current will flow through the fixed contact 172 and lead 180 to the fixed contact 110 from where it will flow through the conduit 112 to the left hand end of the field 114 of the left hand motor. From the right hand end of the field 114 the current will flow through the limit switch to the conduit 120 and through this conduit to the fixed contact 106 from which it will flow through the shunt lead 182 to the fixed contact 176, and from thence through the associated movable contact 168 and lead 184 to the conduit 124 through which it will flow to the brush 126 of the left hand motor 62, and from this brush through the armature and brush 128 to ground through the variable resistance 130. At the same time current from the lead 96 will flow through the movable contact 166 and associated fixed contact 174 to the lead 186 and through this lead to the fixed contact 188 from which it will flow through the connectors 190 and 146 and the fixed contacts 142 and 160 to the conduit 148 through which it flows to the right hand end of the field 114' of the right hand motor 62'. From the left hand end of the field 114 the current flows through the limit switch 80' to the conduit 150 and through this conduit to the fixed contact 178 from which it flows to the movable contact 170 and from there through the lead 192 to the conduit 156. The current then flows through the conduit 156 to the brush 126 of the motor 62' and from this brush through the armature and brush 128' to ground through the variable resistance 130'. From this description it will be seen that a rotation of the central switch 90 to the left will cause both of the motors 62 and 62' to rotate in the same specific direction simultaneously, thereby adjusting both of the tabs 32 and 32' in the same direction with respect to their associated rudders 26 or 26'.

If the middle switch 90 be rotated to the right instead of to the left as described above, the movable contacts 164, 166, 168, and 170 will be associated with the fixed contacts 194, 196, 198, and 188 respectively. Under these conditions the current will flow from the bus bar 86 through the lead 96 to the movable contacts 164 and 166. From the movable contact 164 the current will flow to the fixed contact 194 and from this contact through the lead 200 to the fixed contact 132, and from thence through the conduit 134 to the limit switch 80. Providing the tab is not then in its corresponding limiting position, the current will flow through the limit switch to the right hand end of the field 114 of the left hand motor 68, and from the left hand end of the field through the conduit 112 to the fixed contact 110. From this contact the current will continue through the lead 180 to the fixed contact 172 and from thence through the shunt lead 202 to the fixed contact 198 from which it will pass to the movable contact 168 and from thence through the lead 184 to the conduit 124, and through this conduit to the brush 126 of the left hand motor 68. From this brush the current flows through the motor armature and brush 128 to ground through the variable resistance 130. At the same time the current will flow from the movable contact 166 to the fixed contact 196 and from thence through the lead 204 to the fixed contact 158. From this contact the current flows through the conduit 162 to the limit switch 80' and through this limit switch to the left hand end of the field 114' of the right hand motor 62'. The current then flows from the right hand end of the field 114' through the conduit 148 to the fixed contact 160 and from this fixed contact through the leads 146 and 190 and fixed contact 198 to the fixed contact 188 from which point it passes through the associated movable contact 170 and the lead 192 to the conduit 156. The current flows through this conduit 156 to the brush 126' and from this brush through the motor armature and brush 128' to ground through the variable resistance 130'. Thus it will be seen that a rotation of the switch 90 to the right reverses the direction of the flow of current through the fields of both motors with respect to the direction obtaining when the switch is rotated to the left as described above, thereby causing the motors to operate in the opposite direction and the tabs to move to the opposite sides corresponding to the direction of rotation of the respective switches.

From the above description it will be observed that both tab motors may be caused to operate in either direction desired by appropriate rotation of the joint control switch 90 and that each motor may be caused to operate independently to rotate in either direction as desired by appropriate operation of the respective separate control switch 88 or 92. Thus a slight out of trim condition can be compensated by the adjustment of only one of the rudder tabs, a greater out of trim condition can be compensated by adjustment of both rudder tabs simultaneously and in case the two tabs should get out of phase or step with each other then can be readily coordinated by the proper operation of the independent control switches.

To each of the tab operating mechanisms there is connected an electrical indicating device designated by the numerals 206 and 206'. Each of the indicated devices is connected with a respective indicating instrument 208 and 208' so that the exact position of each of the trimming tabs can be ascertained by glancing at the instruments mounted in the instrument panel 210 in view of the pilot. The indicator 206 is connected to its associated instrument 208 by means of a pair of conduits 212 and 214 and the indicator 206' is connected with its associated instrument 208' by means of a similar pair of conduits 212' and 214'. The two indicators 206 and 206' are connected together by a conduit 216 and the two instruments 208 and 208' are connected together by a conduit 218. A lead 220 leads from the battery 82 to the conduit 218 which conduit distributes current to the two instruments 208 and 208'. From each instrument the current flows through one of the conduits 212 or 214 to its respective indicator 206 and returns through the other of the conduits and after passing through an operative portion of the instrument, is grounded at 222 in case of the instrument 208, and 222', in case of the instrument 208'. As these position indicators in various forms are old and well-known in the art, it is thought that the specific description of such an indicator is not necessary for the purpose of this disclosure.

In the operation of the device, if the pilot senses an out of trim condition or desires for any other reason to adjust the trimming tabs to place a reactive force upon the tail or empennage of the airplane, and if he desires to accomplish this by an adjustment of both rudders, he will operate the joint control switch 90 in the appropriate direction to obtain the adjustment of the trimming tabs desired. In general the pilot will maintain the switch on in the proper direction for a short interval and then determine the effect of the correction made. If he finds he has undercorrected, he will, of course, operate the switch to obtain a further adjustment in the same direction, and if he finds that he has overcorrected, he will operate the switch to obtain a reduction of the adjustment, in any case, he will feel out the adjustment until he is satisfied that he has obtained the correct compensation for the condition he wishes to correct. For this reason it is necessary that the operation of the tabs be comparatively slow and extremely sensitive, as otherwise it will be impossible for the pilot to obtain the accurate setting he desires. Either one of the tabs may be adjusted independently in a similar manner to correct a minor out of trim condition, and if for any purpose it should be desired, the two tabs could be adjusted independently in opposite directions.

While the actuating mechanism and the control system has been illustrated and described as applied to the trimming tab for a rudder or to the trimming tabs for twin rudders, it is obvious that the same type of mechanism could be used if desired for the operation of tabs connected to the ailerons, elevators, or even to the lift increasing wing flap if desired.

While there has been illustrated and described a particular mechanical embodiment of what is now considered to be the preferred form of the invention, it is to be understood that the invention is not limited to the particular mechanical embodiment so illustrated and described, but that such changes in the size, shape, and arrangement of parts may be resorted to as come within the scope of the appended claims.

Having now described the invention so that others skilled in the art may clearly understand the same, what it is desired to secure by Letters Patent is as follows:

1. In an airplane having twin rudders and a trimming tab for each rudder, a reversible mechanism carried by each rudder for operating the respective tab, and manually actuatable control means for controlling said actuating means to operate said tabs independently or simultaneously.

2. In an airplane having twin rudders and a trimming tab for each rudder, means including a reversible electric motor carried by each rudder for operating the respective tab, a manually operable switch for controlling each motor independently, and a manually operable switch for controlling both motors simultaneously.

IGOR I. SIKORSKY.